(12) United States Patent
Enokijima et al.

(10) Patent No.: US 9,315,121 B2
(45) Date of Patent: Apr. 19, 2016

(54) VEHICLE SEAT RECLINER

(71) Applicants: TOYOTA BOSHOKU KABUSHIKI KAISHA, Aichi-ken (JP); SHIROKI CORPORATION, Kanagawa (JP)

(72) Inventors: Tomohiro Enokijima, Aichi-ken (JP); Eiichiro Tsuji, Aichi-ken (JP); Keiichi Kondou, Aichi-ken (JP)

(73) Assignees: TOYOTA BOSHOKU KABUSHIKI KAISHA, Aichi-Ken (JP); SHIROKI CORPORATION, Kanagawa (JP)

( * ) Notice: Subject to any disclaimer, the term of this patent is extended or adjusted under 35 U.S.C. 154(b) by 0 days.

(21) Appl. No.: 14/493,994

(22) Filed: Sep. 23, 2014

(65) Prior Publication Data

US 2015/0091354 A1    Apr. 2, 2015

(30) Foreign Application Priority Data

Sep. 30, 2013    (JP) .................................. 2013-203639

(51) Int. Cl.
*B60N 2/22* (2006.01)
*B60N 2/235* (2006.01)
*B60N 2/20* (2006.01)
*B60N 2/225* (2006.01)
*B60N 2/68* (2006.01)
*B60N 2/02* (2006.01)

(52) U.S. Cl.
CPC .............. *B60N 2/2213* (2013.01); *B60N 2/20* (2013.01); *B60N 2/2252* (2013.01); *B60N 2/235* (2013.01); *B60N 2/682* (2013.01); *B60N 2002/024* (2013.01); *B60N 2205/50* (2013.01)

(58) Field of Classification Search
CPC ...... B60N 2/2213; B60N 2/2252; B60N 2/20; B60N 2/235

USPC .......................................................... 297/362
See application file for complete search history.

(56) References Cited

U.S. PATENT DOCUMENTS

| 5,277,672 | A | * | 1/1994 | Droulon | ............... | B60N 2/2252 |
| | | | | | | 297/362 |
| 5,536,217 | A | * | 7/1996 | Droulon | ................ | B60N 2/485 |
| | | | | | | 297/362 |
| 5,725,452 | A | * | 3/1998 | Droulon | ............... | B60N 2/2252 |
| | | | | | | 297/362 |

(Continued)

FOREIGN PATENT DOCUMENTS

| FR | 3011513 A1 | * | 4/2015 |
| JP | 2010284315 A | * | 12/2010 |

(Continued)

*Primary Examiner* — Rodney Mintz
(74) *Attorney, Agent, or Firm* — Greenblum & Bernstein, P.L.C.

(57) ABSTRACT

A recliner that connects a seatback to a base in a manner in which a backrest angle is adjustable includes one disk-shaped connecting member and another disk-shaped connecting member, a locking mechanism that locks the relative rotation of the two connecting members, and an outer peripheral ring. The one connecting member has a smaller outer diameter than the other connecting member does. The outer peripheral ring has a joining portion joined to the outer peripheral portion of the other connecting member, an abutting portion bent radially inward so as to abut against the outer peripheral portion of the one connecting member from an outside in the axial direction, and a connecting portion that connects the joining portion to the abutting portion. The connecting portion has a shape in which at least a portion in a circumferential direction thereof extends inclined radially inward from the joining portion toward the abutting portion.

4 Claims, 9 Drawing Sheets

(56) References Cited

U.S. PATENT DOCUMENTS

| | | | |
|---|---|---|---|
| 7,380,882 B2* | 6/2008 | Oki | B60N 2/2356 297/362 |
| 7,563,049 B2* | 7/2009 | Peters | B60N 2/2356 297/369 |
| 7,571,963 B2* | 8/2009 | Peters | B60N 2/2356 267/156 |
| 7,648,204 B2* | 1/2010 | Oki | B60N 2/20 297/367 L |
| 7,677,666 B2* | 3/2010 | Grable | B60N 2/2356 297/366 |
| 7,950,741 B2* | 5/2011 | Mitsuhashi | B60N 2/2227 297/362 |
| 7,967,384 B2* | 6/2011 | Hille | B23K 15/0006 16/239 |
| 8,033,606 B2* | 10/2011 | Mitsuhashi | B60N 2/2252 297/362 |
| 8,162,400 B2* | 4/2012 | Mitsuhashi | B60N 2/682 297/362 |
| 8,262,165 B2* | 9/2012 | Mitsuhashi | B60N 2/2252 297/362 |
| 8,430,453 B2* | 4/2013 | Fujishiro | B60N 2/2356 297/367 P |
| 9,056,566 B2* | 6/2015 | Nagura | B60N 2/2356 297/367 P |
| 2004/0036337 A1* | 2/2004 | Hoshihara | B60N 2/2356 297/367 R |
| 2006/0170269 A1 | 8/2006 | Oki | |
| 2008/0061616 A1* | 3/2008 | Wahls | B60N 2/2254 297/362 |
| 2008/0303331 A1* | 12/2008 | Heo | B60N 2/2356 297/362 |
| 2009/0289488 A1* | 11/2009 | Mitsuhashi | B60N 2/2227 297/354.12 |
| 2010/0060063 A1* | 3/2010 | Hille | B23K 15/0006 297/354.1 |
| 2010/0117429 A1* | 5/2010 | Mitsuhashi | B60N 2/2252 297/354.12 |
| 2010/0180705 A1* | 7/2010 | Mitsuhashi | B60N 2/2252 74/413 |
| 2010/0231022 A1* | 9/2010 | Kim | B60N 2/2356 297/367 R |
| 2010/0259086 A1* | 10/2010 | Heo | B60N 2/2356 297/362 |
| 2011/0193391 A1* | 8/2011 | Mitsuhashi | B60N 2/2356 297/354.1 |
| 2011/0277574 A1* | 11/2011 | Mitsuhashi | B60N 2/2252 74/411.5 |
| 2012/0001469 A1* | 1/2012 | Stilleke | B60N 2/2356 297/354.1 |
| 2012/0019041 A1* | 1/2012 | Leconte | B60N 2/2252 297/463.1 |
| 2012/0025586 A1* | 2/2012 | Legras | B60N 2/2255 297/463.1 |
| 2013/0300173 A1* | 11/2013 | Boisgontier | B60N 2/235 297/354.1 |
| 2013/0300174 A1* | 11/2013 | Ito | B60N 2/1615 297/354.1 |
| 2014/0077559 A1* | 3/2014 | Higashi | A47C 1/024 297/354.1 |
| 2014/0077562 A1* | 3/2014 | Higashi | B60N 2/235 297/367 R |
| 2014/0125105 A1* | 5/2014 | Yamada | B60N 2/235 297/354.12 |
| 2014/0225409 A1* | 8/2014 | Nagura | B60N 2/2213 297/354.1 |
| 2014/0284989 A1* | 9/2014 | Nagura | B60N 2/235 297/463.1 |
| 2015/0123444 A1* | 5/2015 | Assmann | B60N 2/20 297/367 P |

FOREIGN PATENT DOCUMENTS

| | | |
|---|---|---|
| JP | 2011-116303 | 6/2011 |
| JP | 2012056530 A * | 3/2012 |
| JP | 4916155 | 4/2012 |

* cited by examiner

VEHICLE SEAT RECLINER

INCORPORATION BY REFERENCE

The disclosure of Japanese Patent Application No. 2013-203639 filed on Sep. 30, 2013 including the specification, drawings and abstract is incorporated herein by reference in its entirety.

BACKGROUND OF THE INVENTION

1. Field of the Invention

The invention relates to a recliner. More particularly, the invention relates to a recliner that connects a seatback to a base on a floor, in a state in which a seatback angle is adjustable.

2. Description of Related Art

Japanese Patent No. 4916155 describes a structure in which a seatback of a vehicle seat is connected to a seat cushion via a recliner, in a state in which a seatback angle is adjustable. The recliner includes a ratchet and a guide that are assembled together in a state in which they are rotatable relative to each other, and a locking mechanism that locks the relative rotation of these. The recliner is configured such that the ratchet and the guide are assembled in a state in which they are both prevented from slipping off in an axial direction, by a cylindrical outer peripheral ring that is attached straddling outer peripheral portions of the ratchet and the guide. More specifically, the cylindrical outer peripheral ring supports the ratchet so that it does not fall off of the guide in the axial direction, by the outer peripheral ring being joined to the guide by one end thereof being fit onto an outer peripheral portion of the guide, and a seat surface portion that is bent a radially inward and formed on the other end thereof being abutted against the outer peripheral portion of the ratchet in the axial direction.

SUMMARY OF THE INVENTION

However, in the related art, a cross-section of the seat surface portion formed on the other end of the outer peripheral ring has a shape that is bent at a right angle in an L-shape. Therefore, if the ratchet has a shape that is slightly smaller than the guide, there will be wasted space in the radial direction between the outer peripheral portion of the ratchet and the outer peripheral ring. The invention provides a recliner with the outer peripheral ring of which size is reduced.

One aspect of the invention relates to a recliner that connects a seatback to a base on a floor in a manner in which a backrest angle is adjustable. The recliner includes: one disk-shaped connecting member and another disk-shaped connecting member that are assembled to each other in an axial direction in a state rotatable relative to each other; a locking mechanism that is provided between the two connecting members and locks the relative rotation of the two connecting members; and an outer peripheral ring that is attached straddling an outer peripheral portion of each of the two connecting members and retains the two connecting members in a state assembled to each other in the axial direction. The one connecting member has a smaller outer diameter than the other connecting member does. The outer peripheral ring has a joining portion that is joined to the outer peripheral portion of the other connecting member, an abutting portion that is bent radially inward so as to abut against the outer peripheral portion of the one connecting member from an outside in the axial direction, and a connecting portion that connects the joining portion to the abutting portion. The connecting portion has a shape in which at least a portion in a circumferential direction thereof extends inclined radially inward from the joining portion toward the abutting portion.

Here, the outer peripheral portion of the other connecting member to which the joining portion of the outer peripheral ring is joined includes either side surface facing the axial direction of the other connecting member, besides the outer peripheral surface of the other connecting member.

According to this aspect, the outer peripheral ring has the connecting portion being inclined as described above, so the connecting portion fills the step-shaped space formed between the outer peripheral portion of the one connecting member that has a small outer diameter and the outer peripheral portion of the other connecting member that has a large outer diameter. In this way, the outer peripheral ring of the recliner is able to be made smaller by providing the outer peripheral ring in a state in which it fills in the space and does not protrude.

In the aspect described above, the joining portion may be surface-abutted against the outer peripheral portion of the other connecting member from an outside in a radial direction, and integrally welded thereto.

According to this structure, the protrusion of the outer peripheral ring toward the outside in the radial direction is able to be kept to a minimum, which enables the outer peripheral ring to be made smaller, by providing the joining portion in a state in which it is surface-abutted along the outer peripheral portion of the other connecting member.

In the aspect described above, the outer peripheral portion of the one connecting member May be chamfered so as to incline radially inward toward the outside in the axial direction.

According to this structure, the connecting portion of the outer peripheral ring is able to be provided through a space provided by the chamfer, so the outer peripheral ring is able to be made even smaller.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Example embodiments of the invention will now be described with reference to the accompanying drawings.

Figure 1:
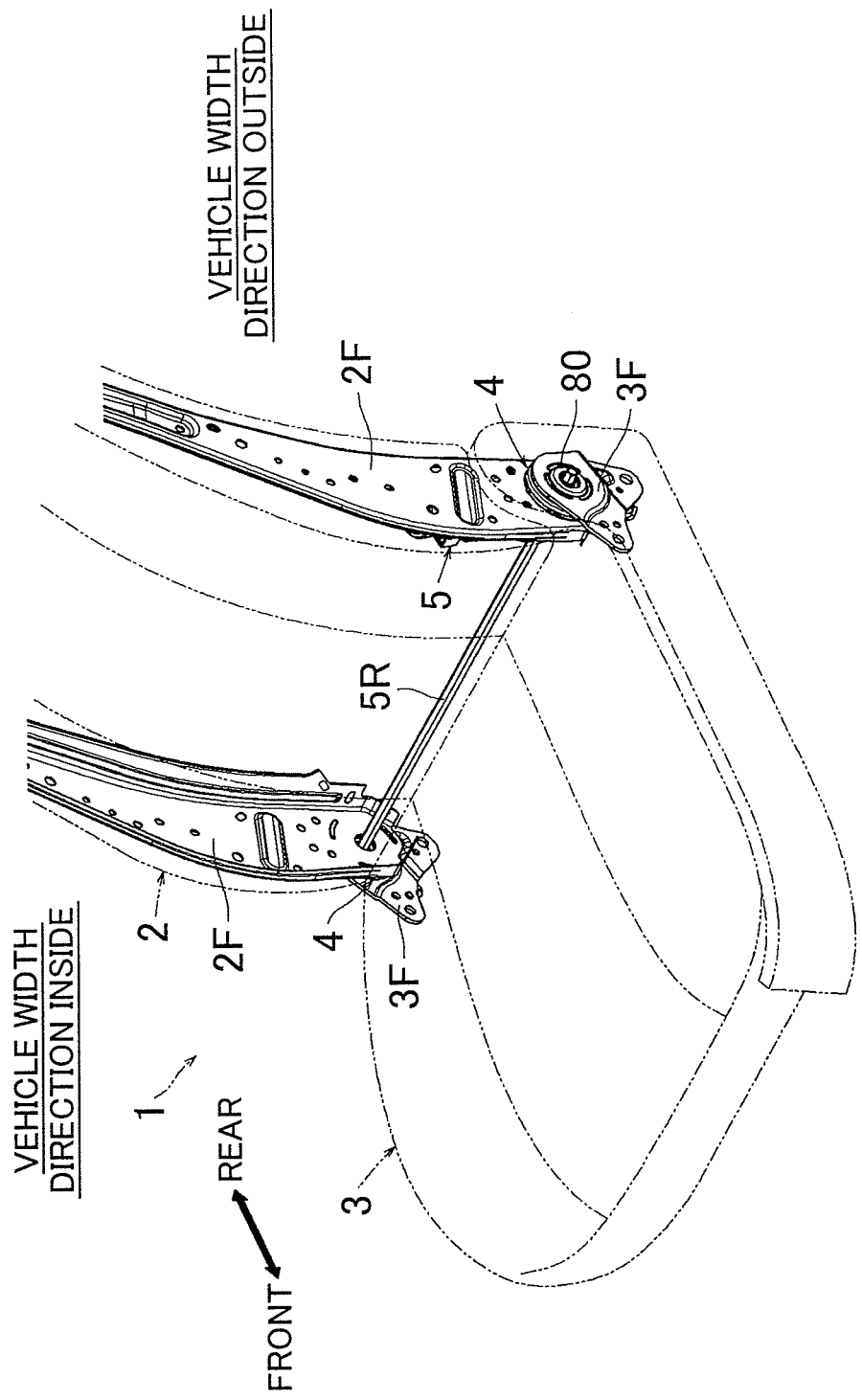
FIG. 1 is a perspective view schematically showing a vehicle seat to which a recliner according to a first example embodiment of the invention has been applied.
Figure 2:
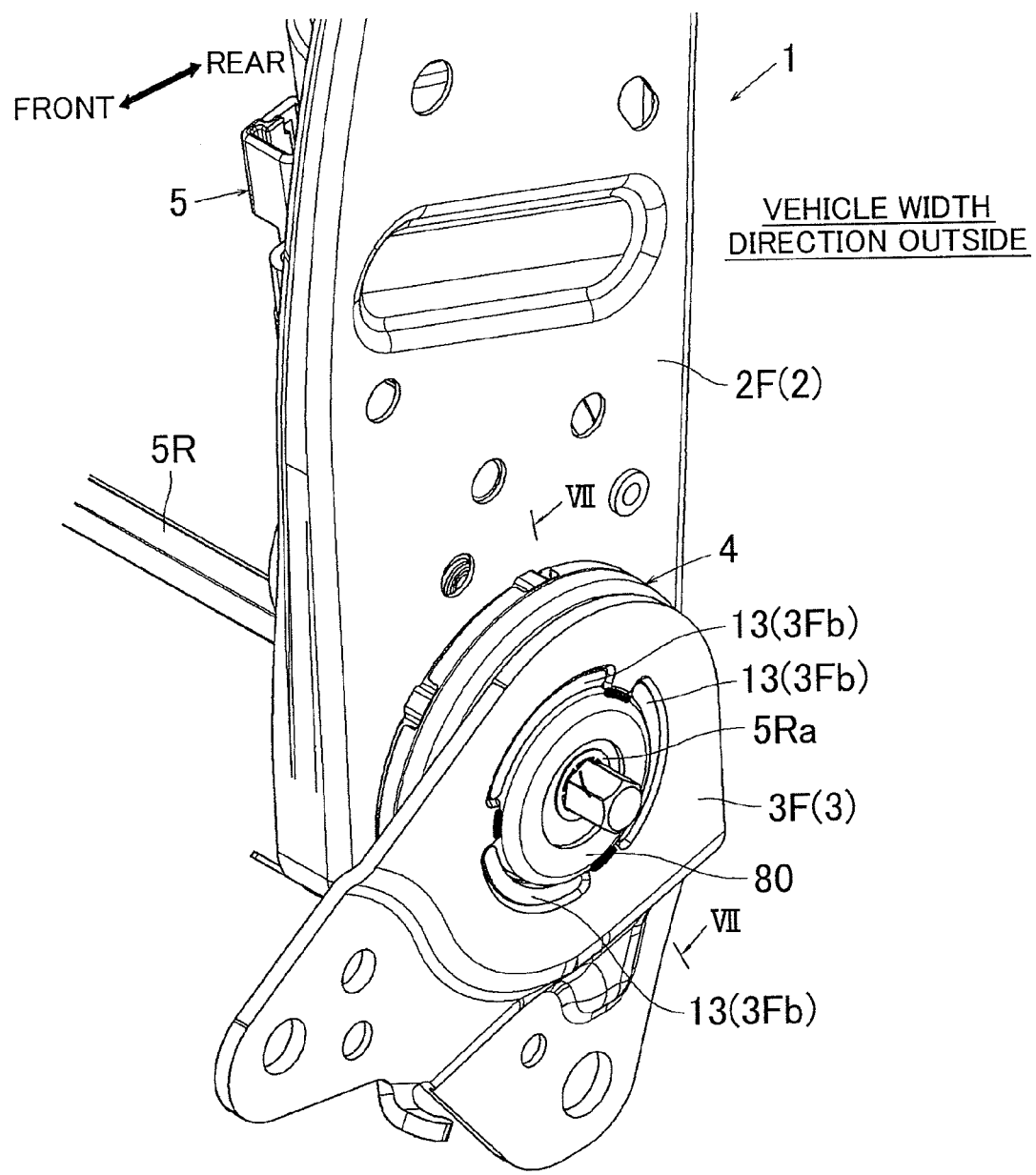
FIG. 2 is an enlarged perspective view of a connecting portion of a seatback and a seat cushion.
Figure 3:
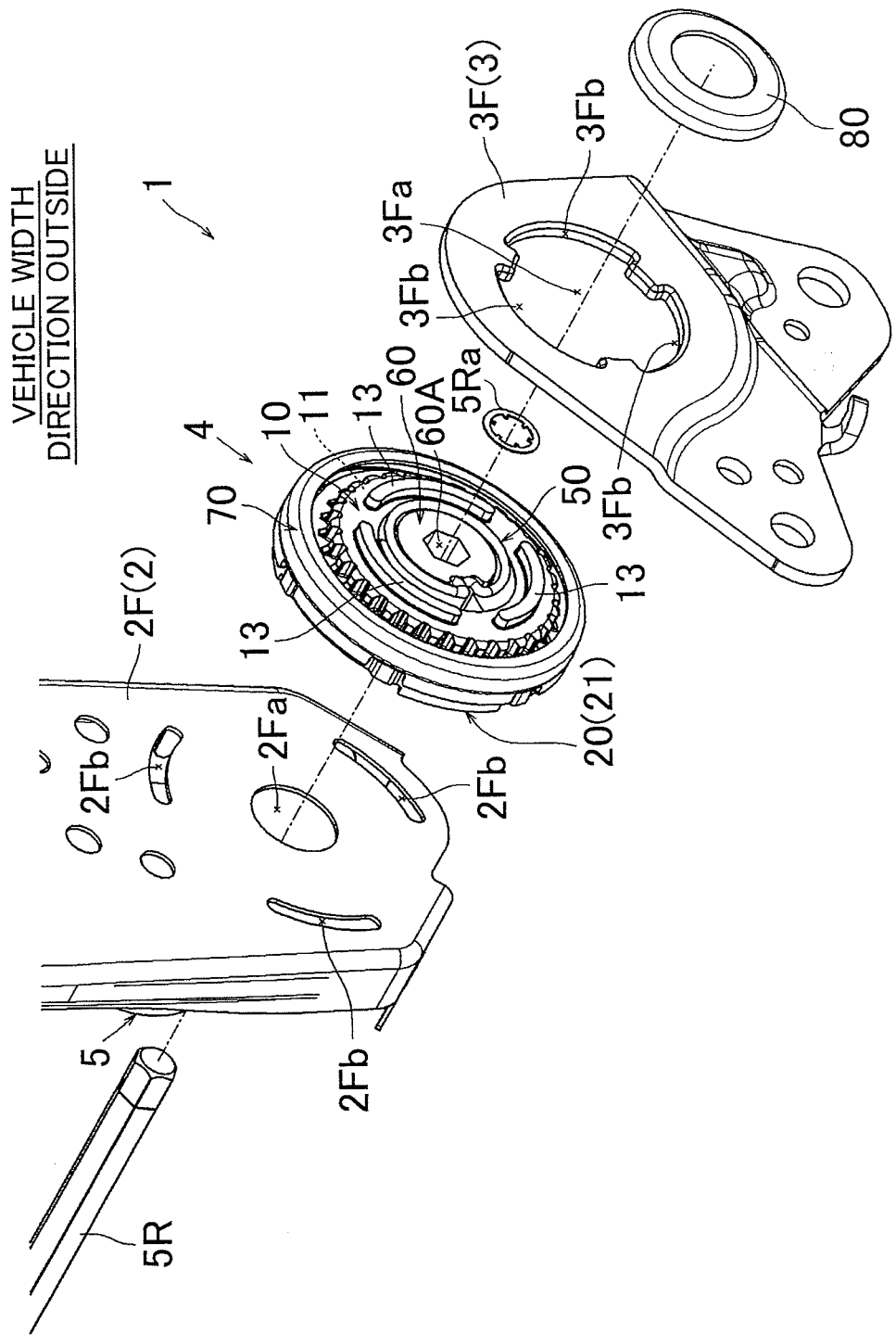
FIG. 3 is an exploded perspective view of the connecting portion.
Figure 4:
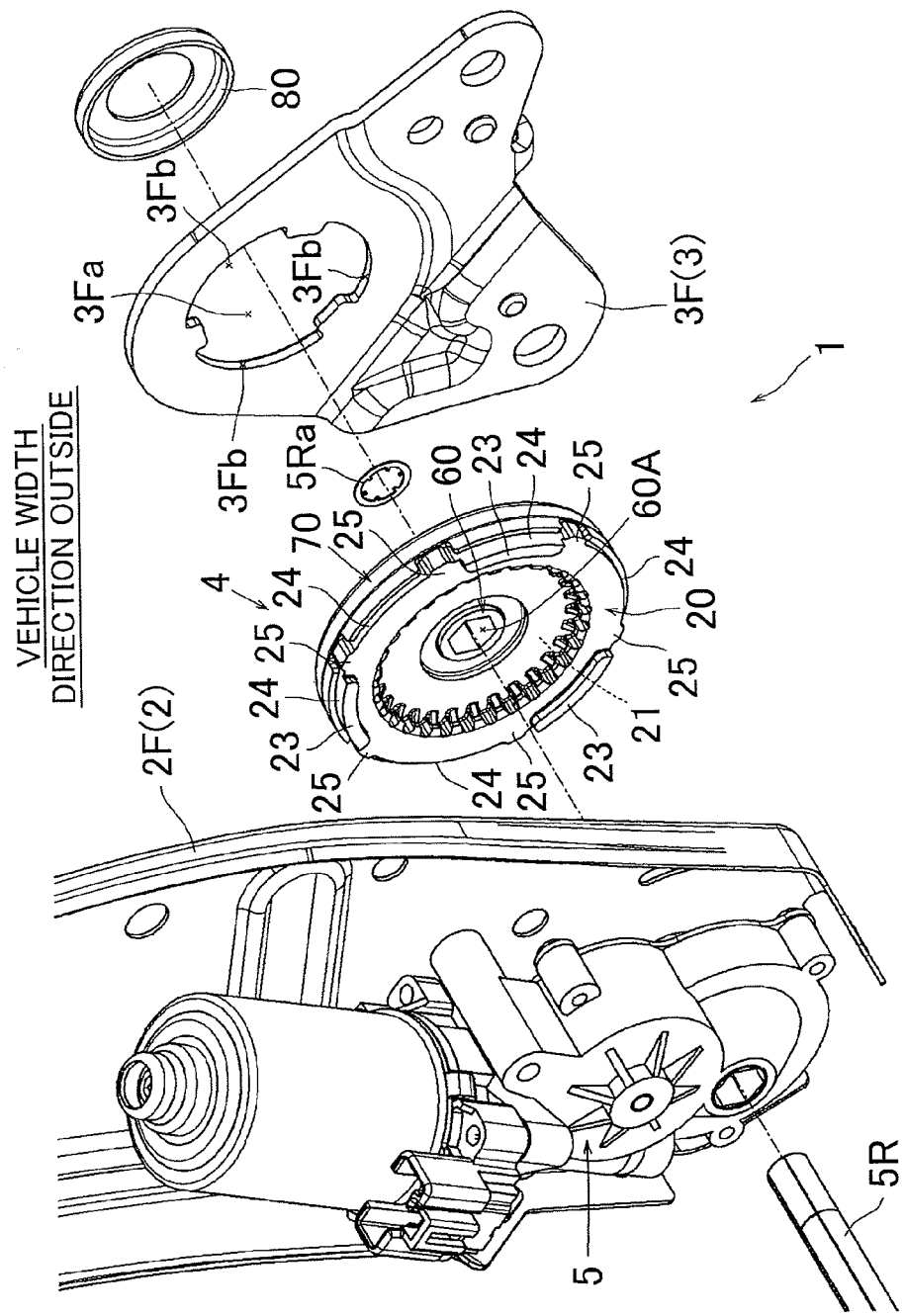
FIG. 4 is an exploded perspective view of the connecting portion viewed from a different direction.

First, the structure of a recliner 4 according to a first example embodiment of the invention will be described with reference to FIGS. 1 to 9. The recliner 4 in this example embodiment is applied to a seat 1 of a vehicle, and functions as a lockable rotating shaft device (coupling device) that connects a seatback 2 that serves as a backrest of a seated occupant to a seat cushion 3 that serves as a seating portion, in a state in which a backrest angle is adjustable, as shown in FIG. 1. Here, the seat cushion 3 functions as the "base" of the invention. The recliner 4 described above is provided interposed between a lower end portion of each of two side frames 2F that form frames of both left and right side portions of the seatback 2, and a rear end portion of each of two side frames 3F that form frames of both left and right side portions of the seat cushion 3, and connects these portions together. More specifically, as shown in FIGS. 2 to 4, the side frames 2F on both the left and right sides of the seatback 2 are provided positioned to the inside of the side frames 3F on both the left and right sides of the seat cushion 3, and the recliners 4 are provided interposed between these.

Each recliner 4 has a power-operated structure, and is normally kept in a state in which the backrest angle of the seatback 2 is fixed (i.e., in a locked state). The recliners 4 are rotated in unison so as to change the backrest angle of the seatback 2 in the front-rear direction, by a power switch, not shown, that is provided on an outer side portion of the seat cushion 3 in a vehicle width direction, being operated. These recliners 4 stop rotating in unison when the power switch stops being operated.

More specifically, an operating member 60 for rotating the recliner 4 is built into a center portion of each recliner 4. These operating members 60 are integrally connected together via a rod 5R, such that when the rod 5R rotates, the recliners 4 are rotated in unison so as to change the backrest angle of the seatback 2 in the front-rear direction. The rod 5R is provided connected, in a state able to transmit power, to a drive unit 5 that is fixed to an inner side surface of the side frame 2F of the seatback 2 on the outer side in the vehicle width direction. This rod 5R is rotated in both forward and reverse directions, and locked (i.e., prevented from rotating), by rotating force and braking force transmitted from the drive unit 5.

Figure 5:
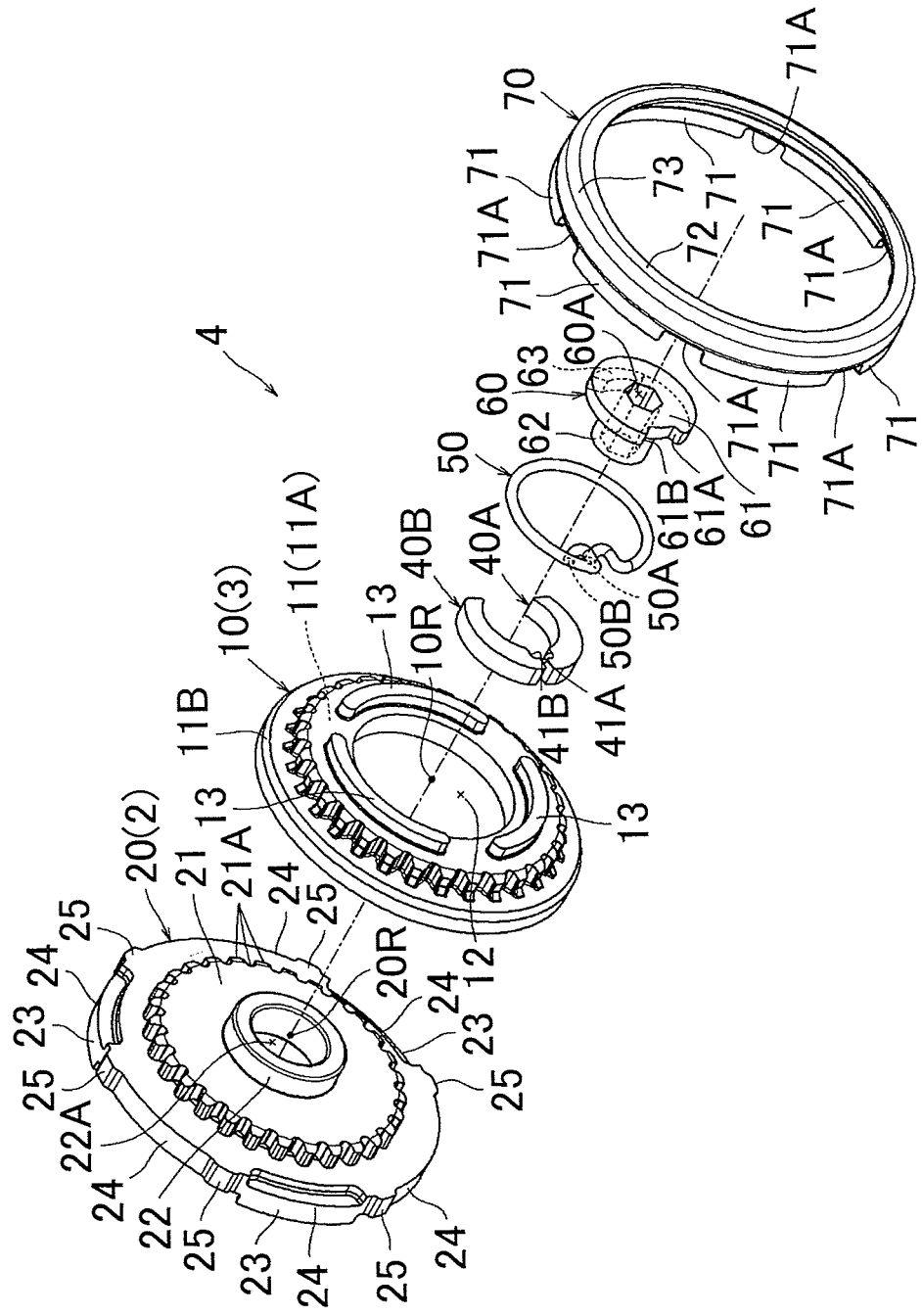
FIG. 5 is an exploded perspective view of the recliner.
Figure 6:
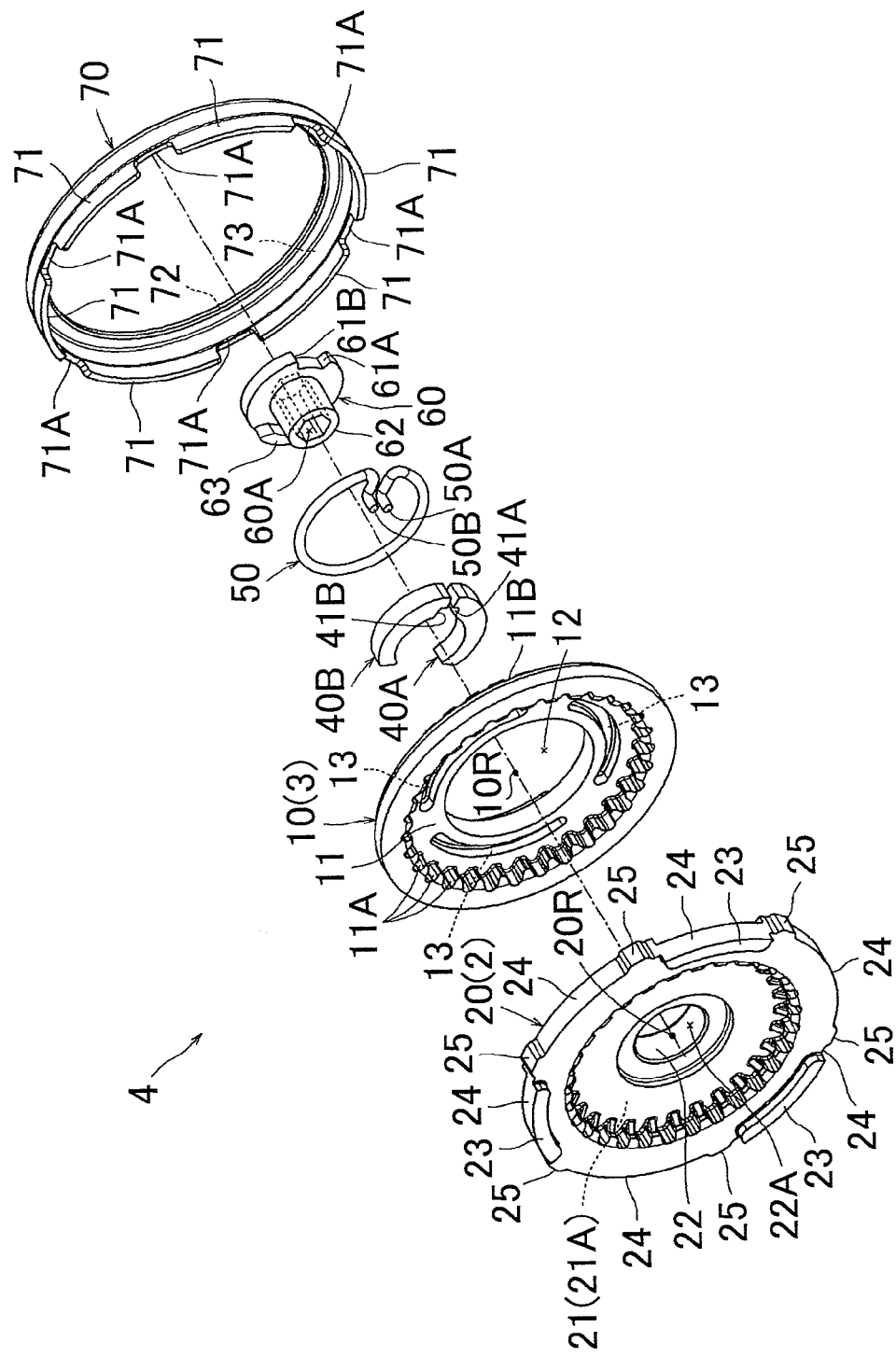
FIG. 6 is an exploded perspective view of the recliner viewed from a different direction.

Hereinafter, the specific structure of the recliners 4 described above will be described in detail. The recliners 4 are arranged in bilaterally symmetrical to each other, but have essentially the same structure. Therefore, in the description below, the structure of the recliner 4 arranged on the outer side in the vehicle width direction shown in FIGS. 2 to 4 will be described as a representative of these. As shown in FIGS. 5 and 6, the recliner 4 includes a disk-shaped cushion-side connecting member 10 and a disk-shaped back-side connecting member 20 that are assembled together in an axial direction, a pair of wedge members 40A and 40B assembled between these, a lock spring 50 assembled straddling the pair of wedge members 40A and 40B, an operating member 60 that is pivotally attached to a center portion of the back-side connecting member 20, and an outer peripheral ring 70 having a cylindrical shape with a seat, assembled straddling both of the connecting members 10 and 20.

Both of the connecting members 10 and 20, the pair of wedge members 40A and 40B, and the operating member 60 are each formed by hard steel sheet that has been quenched. In the first example embodiment, the cushion-side connecting member 10 functions as the "one connecting member", the back-side connecting member 20 functions as the "other connecting member, and an operating mechanism formed from the pair of wedge members 40A and 40B and the lock spring 50 functions as the "locking mechanism" of the invention.

The cushion-side connecting member 10 has a general disk shape, and an internal gear 11 that protrudes in a cylindrical shape in the axial direction that is the direction in which the cushion-side connecting member 10 is assembled to the back-side connecting member 20, is provided on an outer peripheral edge portion of the cushion-side connecting member 10. The internal gear 11 is formed by half blanking performed in the plate thickness direction of the cushion-side connecting member 10. A row of internal teeth 11A is provided lined up in a circumferential direction on an inner peripheral surface of this internal gear 11. The row of internal teeth 11A is able to mesh with a row of external teeth 21A of an external gear 21 provided on a center portion of the back-side connecting member 20 that will be described later, with the row of internal teeth 11A pushed against the row of external teeth 21A from the radially inner side.

Also, a round hole 12 that passes through in the plate thickness direction in a round shape is provided in the center portion of the cushion-side connecting member 10. A cylindrical portion 22 formed protruding on the center portion of the back-side connecting member 20 that will be described later, and the pair of wedge members 40A and 40B, are assembled inside this round hole 12. The cushion-side connecting member 10 locks the back-side connecting member 20 against rotation (i.e., keeps the back-side connecting member 20 from rotating), or allows the back-side connecting member 20 to rotate relative to the cushion-side connecting member 10 in the front-rear direction, by the pair of wedge members 40A and 40B being pushed in from both directions in the circumferential direction, or being pushed around to one side, between the inner peripheral surface of the round hole 12 and the cylindrical portion 22 of the back-side connecting member 20 assembled inside the round hole 12.

Figure 7:
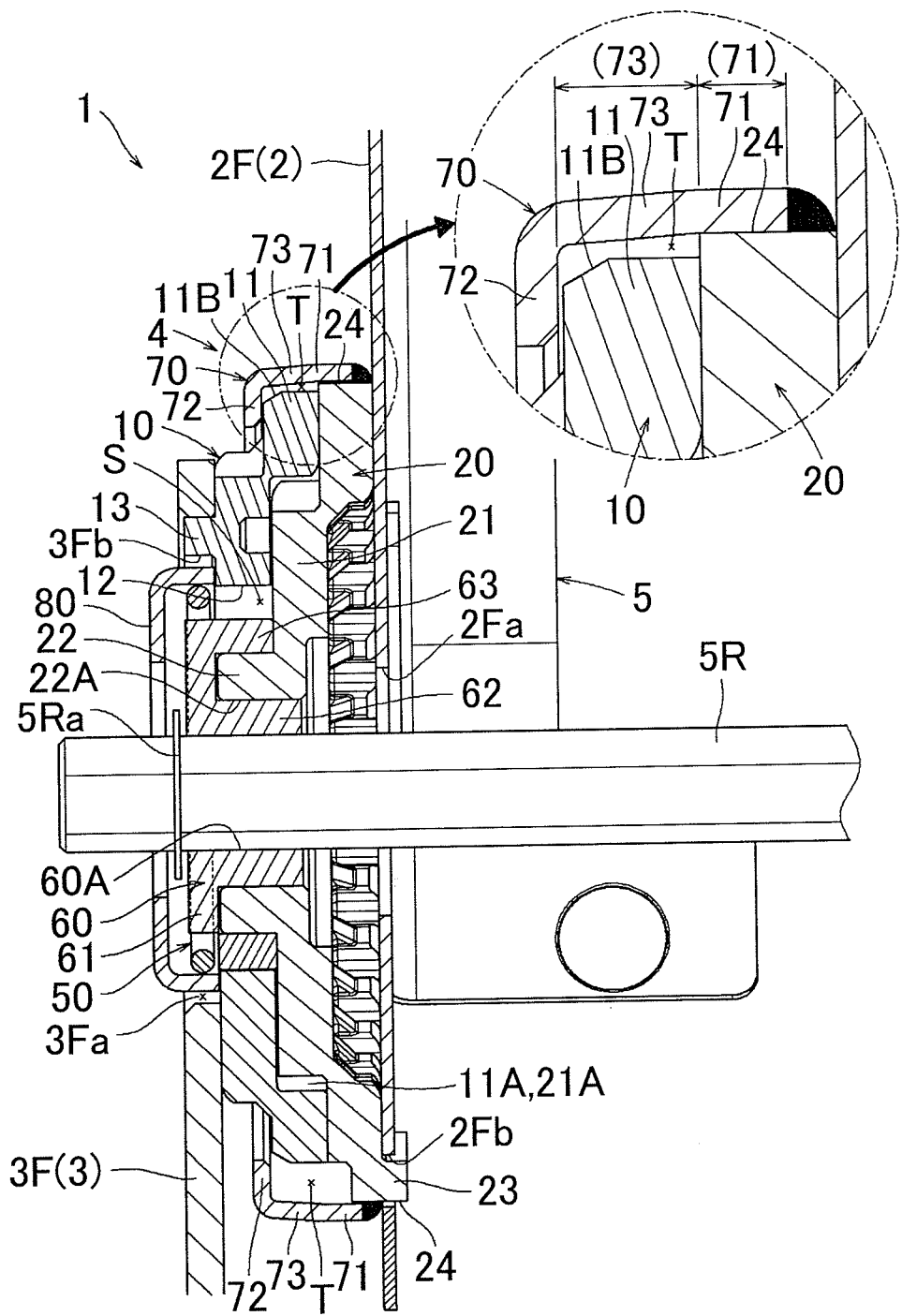
FIG. 7 is a sectional view taken along line VII-VII in FIG. 2.

Also, as shown in FIG. 5, three arc-shaped dowels 13 that protrude in the axial direction are provided lined up at substantially equidistant intervals in the circumferential direction in positions on the same circumference of a circle, on an outside surface of the cushion-side connecting member 10 in the axial direction. The dowels 13 are formed by half blanking performed on a side wall portion of the center portion of the cushion-side connecting member 10 in the plate thickness direction thereof. The dowels 13 are portions that are fitted into three dowel holes 3Fb formed in the side frame 3F of the seat cushion 3, and integrally joined thereto by welding, when the outside surface of the cushion-side connecting member 10 in the axial direction is abutted against and joined to the inside surface of the side frame 3F, as shown in FIGS. 3 and 7. A round insertion hole 3Fa that passes through in a shape that spans the three dowel holes 3Fb is provided in the side frame 3F of the seat cushion 3 (see FIG. 3).

As shown in FIGS. 5 and 6, the back-side connecting member 20 has a general disk shape with an outer diameter slightly larger than the cushion-side connecting member 10, and the external gear 21 that protrudes in a cylindrical shape in the axial direction is provided in a center portion of the back-side connecting member 20. The external gear 21 is formed by half blanking performed in the plate thickness direction of the back-side connecting member 20. The row of external teeth 21A that are able to mesh with the row of internal teeth 11A provided on the inner peripheral surface of the internal gear 11 of the cushion-side connecting member 10 is provided in a line in the circumferential direction on the outer peripheral surface of this external gear 21. The row of external teeth 21A is provided along the entire circumference area on the outer peripheral surface of the external gear 21.

The external gear 21 has a smaller outer diameter than the internal gear 11 of the cushion-side connecting member 10

Also, the external gear 21 has one less tooth than the internal gear 11 of the cushion-side connecting member 10. More specifically, the row of external teeth 21A of the external gear 21 has 33 teeth, and the row of internal teeth 11A of the internal gear 11 has 34 teeth. The back-side connecting member 20 is assembled to the cushion-side connecting member 10, with the teeth in mesh with each other in the radial direction.

Here, the cylindrical portion 22 that protrudes in a cylindrical shape in the axial direction is provided on the center portion of the back-side connecting member 20. The cylindrical portion 22 is formed by burring. The cylindrical portion 22 has an outer diameter that is smaller than the round hole 12 provided in the center portion of the cushion-side connecting member 10, and a round through-hole 22A that passes through in the plate thickness direction is provided in this cylindrical portion 22. When the back-side connecting member 20 and the cushion-side connecting member 10 are assembled in the axial direction such that the external gear 21 of the back-side connecting member 20 meshes with the internal gear 11 of the cushion-side connecting member 10, the cylindrical portion 22 is arranged inside the round hole 12 in the cushion-side connecting member 10, leaving an annular space S between the outer peripheral surface of the cylindrical portion 22 and the inner peripheral surface of the round hole 12 (see FIGS. 7 and 8).

Figure 8:
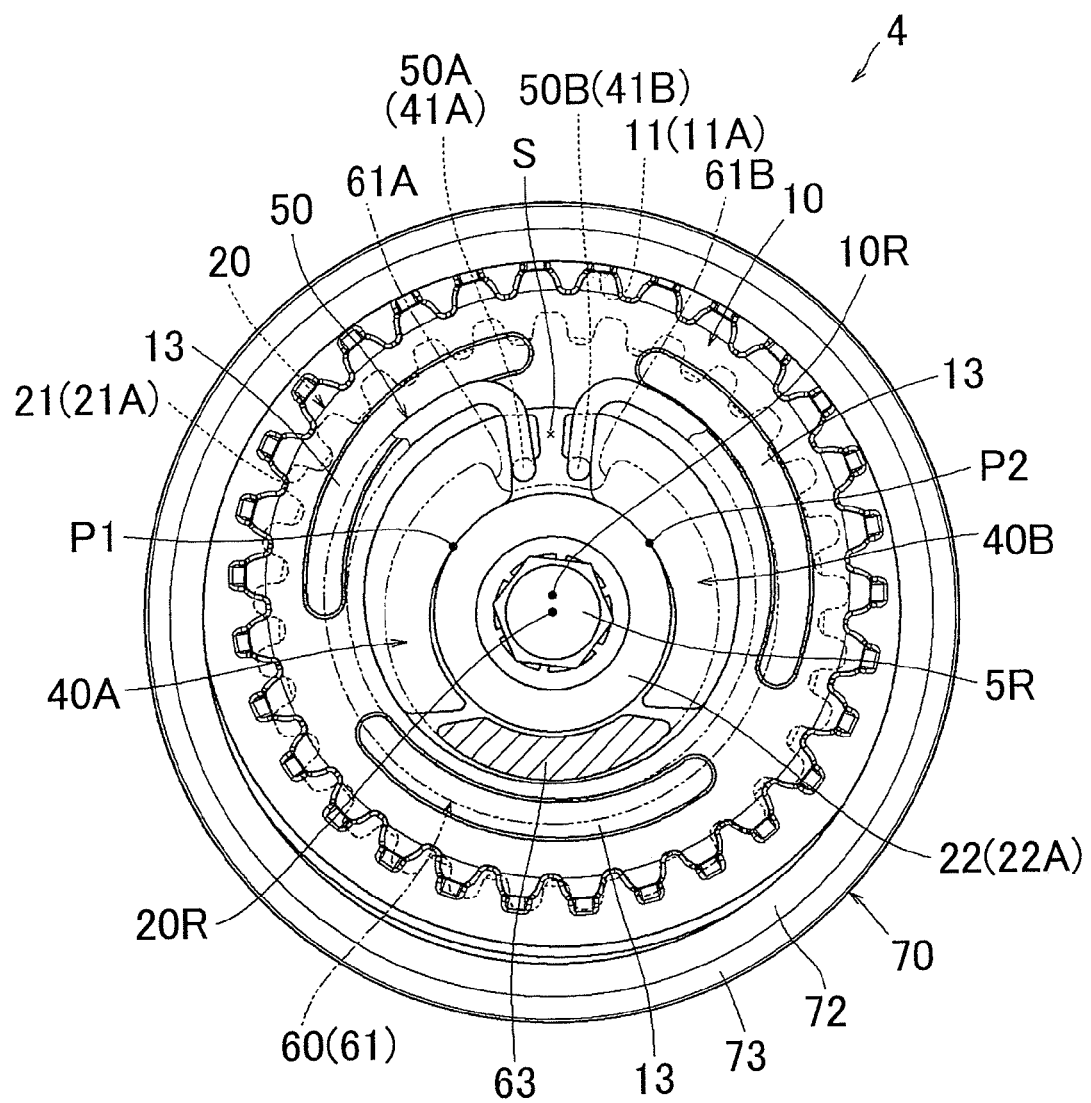
FIG. 8 is a side view of the recliner in a locked state.

As shown in FIG. 8, the back-side connecting member 20 is assembled to the cushion-side connecting member 10 in a state pushed in a specific radial direction (i.e., downward in the drawing) in order to mesh the gears 21 and 11 together, so center positions 20R and 10R are eccentric. As a result, the annular space S in the radial direction is narrow in the circumferential region where the gears 21 and 11 are in mesh with each other, and the annular space S in the radial direction on the opposite side is wide. Also, the pair of wedge members 40A and 40B are arranged inside the annular space S, and further, the open ring-shaped lock spring 50 that applies urging force in a direction pulling the wedge members 40A and 40B apart in the circumferential direction, is hooked between the wedge members 40A and 40B. Accordingly, the pair of wedge members 40A and 40B receives urging force so as to be pushed in from both directions in the circumferential direction, from the region where the space in the radial direction is wide toward the region where the space in the radial direction is narrow, in the annular space S. Also, the force with which these are pushed in keeps the back-side connecting member 20 normally pushed against the cushion-side connecting member 10 in a specific radial direction (i.e., downward in the drawing) (pressing points P1 and P2). As a result, the gears 21 and 11 are kept in mesh with each other in a specific radial direction, and pressed against each other so that there is no backlash, and are thus locked (against rotation).

Also, the back-side connecting member 20 is unlocked from the cushion-side connecting member 10 and is pushed around in the front-rear direction with respect to the cushion-side connecting member 10 while changing the meshing position between the gears 21 and 11 in the rotational direction, by one of the two wedge members 40A and 40B that are in a state pushed in from both directions in the circumferential direction being pushed around in a direction that cancels the pushed-in state (i.e., in the clockwise direction in FIG. 9, for example) by the axial rotation of the operating member 60.

As shown in FIG. 6, three arc-shaped dowels 23 that protrude in the axial direction are provided lined up at substantially equidistant intervals in the circumferential direction in positions on the same circumference of a circle, on an outside surface of the back-side connecting member 20 in the axial direction. These dowels 23 are formed by half blanking performed an outer peripheral edge portion of the back-side connecting member 20 in the plate thickness direction thereof. These dowels 23 are portions that are fitted into three dowel holes 2Fb (see FIG. 3) provided in the side frame 2F of the seatback 2, and integrally joined thereto by welding, when the outside surface of the back-side connecting member 20 in the axial direction is abutted against and joined to the outside surface of the side frame 2F, as shown in FIGS. 4 and 7. A through-hole 2Fa that passes through in a round shape in order to pass the rod 5R through in the axial direction is provided in the center portion of a region surrounded by the three dowel holes 2Fb.

As shown in FIG. 6, a recessed portion 24 that is recessed radially inward is provided in six locations in the circumferential direction, on the outer peripheral portion of the back-side connecting member 20. A protruding portion 25 that protrudes radially outward is provided between each of these recessed portions 24. Each recessed portion 24 has an arc-shape with a center angle being approximately 40 degrees. The region where each recessed portion 24 is formed accounts for most of the region in the circumferential direction of the outer peripheral portion of the back-side connecting member 20. The three dowels 23 described above are provided on every other of the six recessed portions 24 in the circumferential direction.

Each of the six recessed portions 24 functions as an engaging portion that receives in the axial direction, and thus engages with, a corresponding joining portion 71 that protrudes in the axial direction at six locations in the circumferential direction. The engaging portions are provided on an edge portion on one end side of the cylindrical outer peripheral ring 70. Also, each of the six protruding portions 25 provided between the recessed portions 24 functions as retaining portion that abuts in the axial direction against a corresponding indentation 71A provided between the joining portions 71, thereby positioning (i.e., determining) the insertion positions in the axial direction, when inserting the joining portions 71 of the outer peripheral ring 70 to a suitable position in the axial direction inside the recessed portions 24.

Next, the structure of the pair of wedge members 40A and 40B will be described. As shown in FIG. 5, the pair of wedge members 40A and 40B have arc-shapes that are symmetrical to each other, and are assembled into the annular space S formed between the round hole 12 of the cushion-side connecting member 10 and the cylindrical portion 22 of the back-side connecting member 20 (see FIG. 8). Each of these wedge members 40A and 40B has a tapered shape with the thickness in the radial direction becoming thinner from one end side toward the other end side of the arc-shaped portion thereof, so as to follow the shape of the annular space S.

Also, spring hook portions 41A and 41B having a partially cutout shape are provided in the end portion on the thick side of the pair of wedge members 40A and 40B, respectively. End portions 50A and 50B of the open ring-shaped lock spring 50 are hooked from the inside between these spring hook portions 41A and 41B. As a result, the pair of wedge members 40A and 40B receive force in a direction that pulls them apart from each other in the circumferential direction, and thus receive urging force that pushes them in from both directions in the circumferential direction from the region of the annular space S where the space in the radial direction is wide toward the region where the space in the radial direction is narrow, by the urging force of the lock spring 50. Also, the force with which these are pushed in keeps the back-side connecting member 20 normally pushed against the cushion-side connecting member 10 in a specific radial direction (i.e., downward in the drawing) (pressing points P1 and P2). As a result, the gears 21 and 11 are kept in mesh with each other in a specific radial direction, and pressed against each other so that there is no backlash, and are thus locked (against rotation).

The locked state between the gears 11 and 21 (i.e., between both connecting members 10 and 20) by the pair of wedge members 40A and 40B is released by the operating member 60 that is pivotally attached (i.e., attached in an axially rotatable state) inside the cylindrical portion 22 of the back-side connecting member 20 being axially rotated in one direction or the other by axial rotation of the rod 5R. Next, the structure of this operating member 60 will be described. As shown in FIG. 6, the operating member 60 has a generally disk-shaped retainer plate portion 61, a cylindrical portion 62 that protrudes in a cylindrical shape in the axial direction from the center portion of the retainer plate portion 61, and an operating portion 63 that protrudes in an arc-shape in the same axial direction as the cylindrical portion 62 from an outer peripheral edge portion of the retainer plate portion 61.

Figure 9:
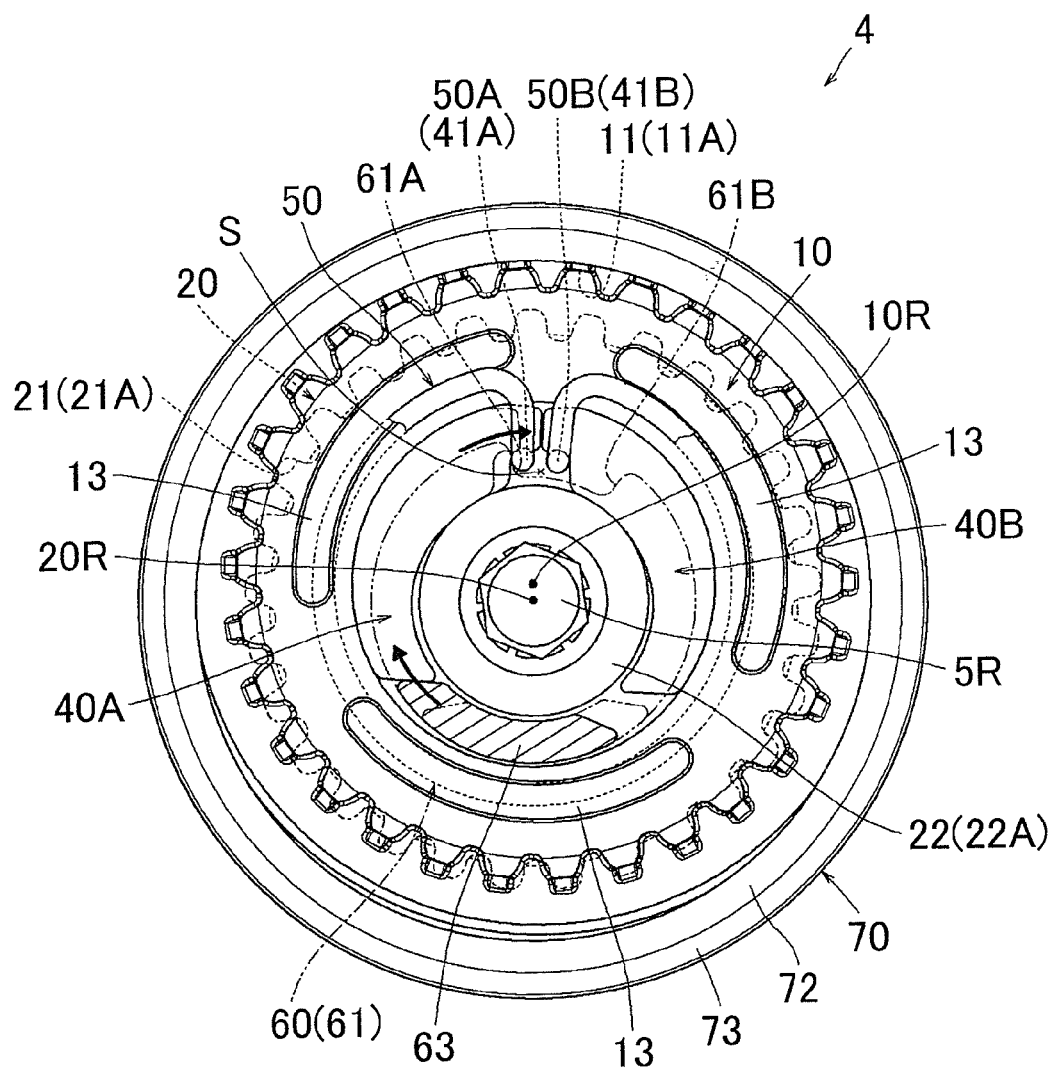
FIG. 9 is a side view of the recliner in a state in which it is rotated in one direction.

A hexagonal hole 60A is provided passing through the cylindrical portion 62 and the retainer plate portion 61, in the center portion of the operating member 60. The rod 5R having a hexagonal-shaped cross section is fitted in this hexagonal hole 60A, so as to be connected with the operating member 60 in an integrated manner in the rotational direction. The retainer plate portion 61 has a notch in which one region in the circumferential direction of the outer peripheral portion thereof is cut out. Each end portion surface facing the rotational direction, provided as a part of the notch, functions as a spring pushing portion 61A and 61B that carries along the end portion 50A and 50B of the lock spring 50 that is hooked on the wedge member 40A and 40B (FIG. 9).

The operating member 60 is provided with the cylindrical portion 62 thereof axially rotatably (i.e., pivotally) supported by being fit into the cylindrical portion 22 of the back-side connecting member 20, as shown in FIGS. 5, 7, and 8. The operating portion 63 is arranged in a space (the annular space S) between the end portions on the tapered side of the pair of wedge members 40A and 40B. The retainer plate portion 61 abuts against the pair of wedge members 40A and 40B from the outside in the axial direction, and the spring pushing portions 61A and 61B are arranged in positions lined up in the circumferential direction with the end portions 50A and 50B of the lock spring 50. In FIGS. 8 and 9, portions of the lock spring 50 and the retainer plate portion 61 of the operating member 60 are shown transparent by virtual lines in order to facilitate understanding of the internal structure of the recliner 4.

The rod 5R is inserted in the axial direction through the hexagonal hole 60A in the center portion of the operating member 60 assembled as described above, and is thus connected in an integrated manner in the rotational direction with the operating member 60. Therefore, when the rod 5R is axially rotated in either the forward or reverse direction by operation of the drive unit 5, the operating member 60 consequently axially rotates in the same direction. Here, the rod 5R is passed through the hexagonal hole 60A of the operating member 60 from the inside toward the outside in the axial direction, and retained in a state prevented from slipping off of the operating member 60 in the axial direction by a retaining washer 5Ra being fitted to a tip end portion of the rod 5R out of the hexagonal hole 60A, as shown in FIG. 2. When the operating member 60 axially rotates in the illustrated clockwise direction as shown in FIG. 9, for example, in response to axial rotation of the rod 5R, the operating portion 63 pushes on the end portion on the tapered side of the wedge member 40A on the left side in the drawing, thereby pushing the wedge member 40A around in the same direction. Also, the spring pushing portion 61A on the left side in the drawing that is provided on the retainer plate portion 61 pushes on the end portion 50A of the lock spring 50 that is hooked on the wedge member 40A on the same side, thereby unhooking the end portion 50A of the lock spring 50 from the wedge member 40A.

As a result of this operation, the operating member 60 allows the wedge member 40A on the left side in the drawing to move from the narrow region of the annular space S, into which it was pushed, to the wide region, and releases the urging force by the lock spring 50 that was hooked on the wedge member 40A, as well as smoothly pushes the wedge member 40A on the same side around in the clockwise direction in the drawing. From this operation, the gears 11 and 21 (i.e., both connecting members 10 and 20) that were locked together by the pair of wedge members 40A and 40B become unlocked, and both wedge members 40A and 40B are pushed around in the clockwise direction in the drawing, and rotated in a manner that gradually pushes out the narrow region of the annular space S in the clockwise direction in the drawing. As a result, a specific radial direction in which the cylindrical portion 22 of the back-side connecting member 20 receives pushing force with respect to the round hole 12 gradually changes in the clockwise direction in the drawing from the lower side in the drawing, such that the position where the external gear 21 meshes with the internal gear 11 gradually changes in the clockwise direction in the drawing. As a result, the external gear 21 rotates (i.e., spins) in the counterclockwise direction in the drawing relative to the internal gear 11 due to the difference in the number of teeth between the two, and the back-side connecting member 20 (i.e., the seatback 2) tilts forward with respect to the cushion-side connecting member 10 (i.e., the seat cushion 3).

This tilting is stopped by the wedge members 40A and 40B being returned again to the pinched pushed-in state in the narrow region of the annular space S by the urging force of the lock spring 50, in response to the axial rotation of the rod 5R being stopped. When the rod 5R is axially rotated in the direction opposite that described above, the recliner 4 rotates in a direction opposite that described above (i.e., in a direction that tilts the seatback 2 back).

As shown in FIGS. 2 and 3, a cylindrical container-shaped cap 80 is fit into the insertion hole 3Fa of the side frame 3F of the seat cushion 3 to which the recliner 4 is joined, and is welded in place. The cap 80 is joined by welding to an outer peripheral portion (i.e., protruding portions provided between the three dowel holes 3Fb) of the insertion hole 3Fa of the side frame 3F, and functions to keep the pair of wedge members 40A and 40B, the lock spring 50, and the operating member 60 that are assembled in the axial direction in the recliner 4, from falling out to the outside in the axial direction.

Next, the structure of the outer peripheral ring 70 will be described. As shown in FIGS. 5 and 6, the entire outer peripheral ring 70 has a generally cylindrical shape by a thin steel sheet being punched out in a hollow disk shape, and the punched out outer peripheral edge portion thereof then being drawn (i.e., raised) in the plate thickness direction. Also, the outer peripheral ring 70 has a hollow disk-shaped seat (i.e., an abutting portion 72) that faces a surface in the axial direction, on an edge portion on one end side in the axial direction thereof. The hollow disk-shaped seat (i.e., the abutting portion 72) is a portion that abuts against the internal gear 11 of the cushion-side connecting member 10 from the outside in the axial direction.

Portions of the outer peripheral ring 70 that extend in generally cylindrical shapes in the axial direction on the side opposite the side on which the abutting portion 72 is provided, are provided as joining portions 71. The six joining portions 71 are arranged separately in the circumferential direction, and each joining portions 71 is fitted in the axial direction into the corresponding recessed portion 24 provided in the outer peripheral portion of the back-side connecting member 20, and joined thereto. Indentations 71A that are cut into and recessed from the end side of the axial direction are provided in the circumferential direction of the joining portions 71.

The inner diameter of the joining portion 71 is approximately the same size as (slightly larger than) the outer diameter of the recessed portion 24, and the length in the circumferential direction of the joining portion 71 is approximately the same size as (slightly shorter than) the circumferential length of the recessed portion 24, such that the joining portion 71 is fitted in the corresponding recessed portion 24 provided in the outer peripheral portion of the back-side connecting member 20 in the axial direction. After the joining portions 71 have been inserted and assembled in the recessed portions 24 of the back-side connecting member 20 in the axial direction, they are integrally joined to an outer peripheral surface portion of the back-side connecting member 20 by welding such as arc welding or laser welding. More specifically, the joining portions 71 each have a shape with a surface extending straight in the axial direction, and are assembled in a state surface-abutting against the outer peripheral surface of the recessed portions 24 in the radial direction, by being fitted in the recessed portions 24 of the back-side connecting member 20. As a result, the joining portions 71 are broadly surface-abutted on both the inside and the outside in the radial direction against the recessed portions 24 of the back-side connecting member 20, and are integrally and strongly joined thereto by welding.

Also, the indentations 71A provided in the regions between where the joining portions 71 are arranged abut in the axial direction against the protruding portion 25 of the back-side connecting member 20 by the joining portions 71 being inserted into the recessed portions 24 to a position where they are suitably fitted, and thus position (i.e., determine) the insertion position of the joining portions 71 in the axial direction. By assembling (joining) the outer peripheral ring 70 to the back-side connecting member 20, the abutting portion 72 of the outer peripheral ring 70 is placed in a state facing the outside of the internal gear 11 of the cushion-side connecting member 10 in the axial direction, and the cushion-side connecting member 10 is kept in a rotatable state without falling off of the back-side connecting member 20 in the axial direction (see FIGS. 3, 4, and 7).

Here, a connecting portion 73 that connects the joining portions 71 and the abutting portion 72 of the outer peripheral ring 70 has an annular shape that is continuous in the circumferential direction, and has a sectional shape that extends inclined radially inward in the axial direction from the joining portions 71 toward the abutting portion 72, as is well illustrated in FIG. 7. The connecting portion 73 has the same shape along the entire periphery of the outer peripheral ring 70. By having the connecting portion 73 be a shape that is inclined radially inward in this way, the connecting portion 73 fills a step-shaped space T that is formed between the outer peripheral portion of the cushion-side connecting member 10 that has a small outer diameter and the outer peripheral portion of the back-side connecting member 20 that has a large outer diameter. As a result, a corner of the recliner 4 on the outer peripheral side is able to be made smaller in both the radial direction and the axial direction.

A chamfer portion 11B that has been chamfered so as to incline radially inward along the entire circumference of the outer peripheral portion of the cushion-side connecting member 10 that is covered from the outer peripheral side by the inclined connecting portion 73 of the outer peripheral ring 70, is formed on the outside corner of that outer peripheral portion of the cushion-side connecting member 10 in the axial direction. This chamfer portion 11B enables the connecting portion 73 of the outer peripheral ring 70 to be a shape that is largely inclined radially inward without interfering with the outer peripheral portion of the cushion-side connecting member 10, and thus enables the corner on the outer peripheral side of the recliner 4 to be even smaller. The corner on the outside in the axial direction where the chamfer portion 11B is formed is a portion that has little effect in terms of maintaining the structural strength of the internal gear 11, so even if the chamfer portion 11B is formed on this portion, the meshing strength of the internal gear 11 and the external gear 21 will not weaken, nor will the internal gear 11 be easily damaged. That is, the structural strength of the internal gear 11 is ensured by the thickness in the radial and axial directions of the area near the inner peripheral surface on which the row of internal teeth 11A is provided, and the thickness of the connecting portion subjected to half blanking in the plate thickness direction thereof from the cushion-side connecting member 10, so even if the chamfer portion 11B is formed on the corner on the outer peripheral side as described above, the structural strength of the internal gear 11 is not likely to be reduced.

In this way, with the structure of the recliner 4 of this example embodiment, by forming the connecting portion 73 of the outer peripheral ring 70 in an inclined shape as described above, the stepped space T formed between the outer peripheral portion of the cushion-side connecting member 10 that has a small outer diameter and the outer peripheral portion of the back-side connecting member 20 that has a large outer diameter is filled in by the connecting portion 73. In this way, the outer peripheral ring 70 is able to be made smaller by providing the outer peripheral ring 70 in a state in which it fills in the space T and does not protrude.

Heretofore, one example embodiment of the invention has been described, but the invention may be carried out in a variety of other modes aside from the example embodiment described above. For example, the recliner of the invention may also be applied to a seat other than a front passenger seat of a vehicle, as well as a seat provided in another type of vehicle other than an automobile, such as a railway (e.g., a train), and other types of conveyances such as an aircraft and a marine vessel and the like.

Also, the recliner need only be a structure that connects a seatback to a base on a floor in a manner in which the backrest angle is adjustable. Aside from a power-operated structure as described in the example embodiment above, a type of structure in which an unlocking operation is performed manually as described in Japanese Patent Application Publication No. 2011-116303 (JP 2011-116303 A) (i.e., a structure that locks relative rotation of a ratchet and a guide (two disk-shaped connecting members) by meshing a row of external teeth of a pawl provided on the guide with a row of internal teeth provided on the ratchet) may also be employed.

Also, in the example embodiment described above, the internal teeth are provided on one connecting member (i.e., the cushion-side connecting member 10), and the external teeth are provided on the other connecting member (i.e., the back-side connecting member 20), but the external teeth may be provided on the one connecting member and the internal teeth may be provided on the other connecting member. With an outer peripheral ring in which the one connecting member has a smaller outer diameter than the other connecting member does, a joining member may be joined to the outer peripheral portion of the other connecting member, an abutting portion may be abutted against the outer peripheral portion of the one connecting member from the outside in the axial direction, and a connecting member that connects the joining portion to the abutting portion may have a shape extending inclined radially inward from the joining portion toward the abutting portion. Therefore, similar to an outer peripheral ring having a type of structure in which the recliner is unlocked by a manual operation as described above, with an outer peripheral ring having a type of structure in which the one connecting member has a smaller outer diameter than the other connecting member does, the outer peripheral ring may be such that a joining portion is joined to the outer peripheral portion of the other connecting member, an abutting portion is abutted against the outer peripheral portion of the one connecting member from the outside in the axial direction, and a connecting portion that connects the joining portion to the abutting portion has a shape extending inclined radially inward from the joining portion toward the abutting portion.

Also, the joining portion of the outer peripheral ring may be integrally joined to the outer peripheral portion of the other connecting member by press-fitting or crimping. Also, the connecting portion of the outer peripheral ring may have a shape extending inclined by being bent in a stepped shape or curved radially inward from the joining portion toward the abutting portion. Also, at least a portion of the connecting portion in the circumferential direction need only extend inclined, and the portion does not necessarily have to be formed along the entire periphery. Also, the chamfer portion formed on the outer peripheral portion of the one connecting member may have a shape chamfered in a stepped shape or curved shape in the same manner as described above. The chamfer portion may be formed on only part of the outer peripheral portion of the one connecting member, or broadly along the entire region of the outer peripheral portion in the axial direction. Also, the joining portion, the abutting portion, and the connecting portion of the outer peripheral ring described above may each be formed continuous in the circumferential direction, or in discontinuous sections in the circumferential direction, or may be formed on only a portion in the circumferential direction.

Aside from being the outer peripheral surface of the other connecting member, the outer peripheral portion of the other connecting member to which the joining portion of the outer peripheral ring is joined may be either side surface facing the axial direction of the other connecting member.

What is claimed is:

1. A recliner that connects a seatback to a base on a floor in a manner in which a backrest angle is adjustable, the recliner comprising:

one disk-shaped connecting member and another disk-shaped connecting member that are assembled to each other in an axial direction in a state rotatable relative to each other;

a locking mechanism that is provided between the two connecting members and locks the relative rotation of the two connecting members; and an outer peripheral ring that is attached straddling an outer peripheral portion of each of the two connecting members and retains the two connecting members in a state assembled to each other in the axial direction, wherein:

the one connecting member has a smaller outer diameter than the other connecting member does;

the outer peripheral ring has a joining portion that is joined to the outer peripheral portion of the other connecting member, an abutting portion that is bent radially inward so as to abut against the outer peripheral portion of the one connecting member from an outside in the axial direction, and a connecting portion that connects the joining portion to the abutting portion; and the connecting portion has a shape in a circumferential direction thereof that extends inclined radially inward from the joining portion toward the abutting portion.

2. The recliner according to claim 1, wherein the joining portion is surface-abutted against the outer peripheral portion of the other connecting member from an outside in a radial direction, and integrally welded thereto.

3. The recliner according to claim 1, wherein the outer peripheral portion of the one connecting member is chamfered so as to incline radially inward toward the outside in the axial direction.

4. The recliner according to claim 1, wherein the connecting portion extends in the axial direction.

* * * * *